3,214,275
PROCESS FOR THE PREPARATION OF BAKED
GOODS AND ALIMENTARY PASTES
Zsigmond Kende and Ferenc Ketting, Budapest, Hungary, assignors, by mesne assignments, to Centropa Handelsgesellschaft m.b.H., Vienna, Austria
No Drawing. Filed Feb. 28, 1962, Ser. No. 176,420
2 Claims. (Cl. 99—85)

For dietary purposes, various protein-rich breads and alimentary pastes of reduced carbohydrate content have been recommended. These are useful for weight-reducing diets and for the diet of those suffering from diabetes and hepatic diseases. However, it has heretofore been impossible to duplicate in such product the palatability, taste and texture of ordinary bread.

For instance, the so-called graham-bread (wheat bread rich in bran) contains hardly less carbohydrate than ordinary wheat bread (approx. 45 percent as against the 50–54 percent carbohydrate content of ordinary wheat bread). The bread and alimentary pastes enriched with aleurone or prepared from pure aleurone have never been widely used, since they do not taste good, cannot be substituted for foodstuffs containing starch or dextrine, their nutritional value is slight, and they do not play therefore any useful role in the caloric and protein regime of the patients.

Many attempts have also been made to enrich bread and alimentary pastes by skimmed milk powder or casein. Only a few percent of skimmed milk powder can, however, be incorporated into the bread, since the taste and character of the latter is utterly changed by this. Similar results have been obtained with casein also. When applying entirely inodorous pure alimentary casein, however, the taste of the bread is harmed to a lesser extent than is the case with skimmed milk powder, but the colloidal-physical properties of the casein render impossible the baking of bread of adequate texture from flours containing casein in excess of 4 percent. Although the few percent of casein introduced by the known processes increase the nutritional value of the bread, being an animal protein of complete value, the bread nevertheless cannot be used in the diet of diabetes, as its carbohydrate content is hardly less than that of ordinary bread.

This invention relates to a process, by means of which casein amounting up to and including 50 percent can be incorporated into bread, rolls, or other baked or cooked dishes made of flour, and in consequence of this their carbohydrate content can be reduced to less than that of the original, without considerable changes occurring in the taste, characteristics, and physical state of bread, baked goods, etc. Thus the process according to the invention renders possible the production of high quality foodstuffs for diabetics, which are of suitable nutritional value and are completely similar to ordinary bread or other foodstuffs at the same time that their carbohydrate content is greatly reduced.

In German Patent No. 1,069,458, a method was developed by the patentees for the processing of casein into a meatlike substance. That invention was based on the fact that, if casein set at a pH value from 4.9 to 5.3 by means of suitable ingredients (mineral salts) is submitted to moderate heat treatment in the presence of moisture, it undergoes swelling owing to the changes in its colloidal-physical properties, and the properties which are important from the point of view of food technology become entirely different from the properties of either the more acid curd, or of the more basic casein of cheese. Such casein is able to absorb water colloidally within wide limits, does not exhibit granular texture similar to curd, it does not liquefy on heating, nor get slimy and sticky like cheese casein. Due to these properties, the casein which has undergone the above mentioned treatment may be processed like meat upon addition of suitable flavours and other ingredients, and cutlets or other dishes may be prepared from it.

The present invention is based on the recognition that the casein treated by the process according to our above mentioned former invention, as against the types of casein used in other experiments in this line, may be incorporated in relatively large proportions into the flour to be used for the preparation of bread, baked goods, alimentary pastes, without harming or changing the taste, characteristics, texture, or appearance of bread, or of other farinaceous foodstuffs to a considerable extent, if they are prepared from such flours having high casein contents.

Such use of the casein treated by the above mentioned method is rendered possible in the first place by the fact, that the casein is very well miscible in this state with various large molecule hydrophylic carbohydrates, such as starch present in flour. In the second place, the pH of bread types of good taste which are not sour, i.e., pH=5.1–5.5, and the somewhat higher pH of noodles viz. 5.4–5.6 are in the range in which the casein exhibits the above mentioned special properties and can thus stand baking or cooking. This latter fact is of primary importance from the standpoint of utilizing casein in bread, baked goods and alimentary pastes.

In our earlier invention referred to above, for the processing of casein to a meat-like product, pH values in the range of 4.9–5.3 have proved to be the most advantageous, both for the processing aptitude of the casein and for the properties of the finished product. However, in the course of our experiments for the purposes of preparing bread and alimentary pastes from mixtures of casein having high casein content, the most favorable results were obtained at the pH values that were adjacent the upper limit of that range, or even higher, for example, 5.4–5.6. The use of such higher ranges is preferred, both from the standpoint of increasing the casein quantities which can be incorporated, and from the standpoint of improving the rising of the dough and the texture of the taste of the bread.

Further increase of the pH value is inadvisable, since above pH=5.6 the casein exhibits properties similar to those of processed cheese, and becomes unsuitable for application in bread or alimentary pastes according to the present invention.

The outstanding features of the process according to the present invention are, therefore, adding to the flour used for the preparation of low calorie bread, baked goods, or alimentary pastes applied as foodstuffs in the diet of diabetics, or in other diets, 20–120 parts casein referred to 100 parts by weight of the flour, adjusting the pH value by means of adding acidic or basic harmless ingredients to the range of 5.1–5.6 for the product prepared from the mixture of casein and flour, preferably from 5.3 to 5.5 for bread, and from 5.4 to 5.6 for alimentary pastes, and swelling the mixture of casein and ingredients influencing the pH value by heating said mixture to a temperature between 70 and 100° C. in the presence of moisture and homogenizing at the same time. When applying rennet casein exclusively, the pH value may be increased up to approx. 5.7.

This swelling and homogenizing heat treatment may be carried out either prior to the admixture of the casein to the flour, or after mixing the casein with the flour, i.e., during the baking of the bread or the cooking of the alimentary pastes, respectively. In the former case we may proceed by mixing the pure alimentary dry casein with suitable quantities of the ingredients for setting the pH value and with water and thereupon the material obtained is subjected to swelling and homogenizing heat treatment. The swelled casein product thus obtained is then mixed with the flour for making bread, etc. in a fresh state, or it is dried and stored in the form of dry powder, for later use. In the second case we may add to the flour the casein in its ordinary dry state without any previous treatment, together with the ingredients necessary for adjusting the pH-value and use this mixture (containing flour, casein and pH-adjusters) for the manufacturing of bread or other baked products made of raised flour paste or for the preparation of dried flour paste products. In this second case the necessary swelling and homogenizing of the casein adjusted to the proper pH-value will be accomplished during the normal heat treatment applied in the course of the baking or cooking of said products in the presence of the moisture normally present during the baking or cooking.

It is advisable to add casein in such quantities to the flour required for the preparation of bread, baked goods, or alimentary pastes (the casein being either swelled by the salts necessary for the setting of the pH value, or by simply admixing the salts to it), that the finished products made of the casein and flour mixture (bread, rolls, or alimentary pastes) should contain only half of the carbohydrate contents of the similar products made without casein. Thus, e.g., the carbohydrate content of common wheat bread or rolls amounts to 51–55 percent, with a protein content of 8–9 percent. If 90–95 percent of dry casein referred to the weight of flour is added to the wheat flour used for the preparation of such bread together with the ingredients required for the setting of pH values, the quality and quantity of which depend on the pH value and quality of the casein employed, then the bread obtained by this method will contain approximately 25 percent of carbohydrates and 33 percent of proteins, having the usual moisture content. It is suitable to prepare bread and alimentary pastes of such composition on the one hand because it renders easier the correct setting of the diets low in carbohydrates and calories, and on the other hand since the taste and quality of the bread containing similar casein quantities still agree with those of ordinary bread to a great extent. The taste of wheat bread of similar composition and containing casein corresponds approximately to that of good quality rye bread, and its texture is completely breadlike. Naturally, its satiating effect is very much greater than that of ordinary bread and it meets all the requirements of bread for diabetics. It is not advisable to employ casein in quantities exceeding 100 parts casein per 100 parts of the weight of flour, since a product of inferior quality and having less bread like character is obtained.

In the process according to this invention not only wheat flour, but also all kinds of alimentary grain (rye, barley, etc.) flours, or other flours may be employed. In the case of bread preparation, however, the flour types poorer in aleurone result in products of lower quality, which may be perhaps counteracted by adding some aleurone.

To set the pH value, whenever the pH of the casein to be utilized is smaller than required, and such is generally the case, basic ingredients are added; when, however, the original pH value is larger than necessary, acidic ingredients are employed. Since the pH value required must be maintained in the baked or cooked finished product also, stable ingredients resisting the heat treatment are always to be used. It is, therefore, advisable to apply inorganic compounds of suitable reactivity, e.g., salts or salt mixtures; utilization of the latter is favourable also because of their buffering effect. Application of harmless compounds of bi- or trivalent cations such as calcium carbonate, calcium lactate or aluminum hydroxide as part of the ingredients has proved very advantageous, since these compounds inhibit peptization and contribute to the maintenance of the good quality of the product. For ingredients increasing the pH value, e.g., alkali bicarbonates or alkali phosphates may be utilized, and for ingredients decreasing the pH values phosphates of acidic reaction, or solid organic acids, like citric acid, may be used. It must, however, be mentioned that the most advantageous types and quantities of ingredients for the purposes of setting the pH value do not depend only on the pH value of the casein applied. Owing to the amphoteric character of casein, even at equal pH values of the starting materials, various quantities or kinds of pH setting ingredients may be required depending on the type and qualities of starting materials and on other substances, e.g., flavouring additives, to achieve the best results. Thus it is advisable to determine the most advantageous quality and quantity of the ingredient for setting the pH value in each individual case experimentally.

The bread, baked goods, and alimentary pastes prepared by the process according to this invention show a further advantage, viz. they may be given an adequately salty taste with such mixture of potassium chloride-sodium chloride as contains the elemental K and elemental Na in a proportion of 4:1 or more, without the bitter taste of the potassium salt being appreciable in the product. Products salted by this method are suitable to be included into a salt poor diet, e.g., in the Na-poor diet of patients suffering from hypertonia, as foodstuffs of a salty taste, or may be utilized as K-carriers during cortisone therapy or other saluetic therapies.

In practice, the process according to this invention may be carried out as follows:

In the case of breadmaking, the dry flour is mixed with the casein and the pH setting ingredients, or with the casein previously swelled and dried in the presence of such ingredients and water, thereupon it is kneaded with the necessary water and yeast quantities to form a dough. Yeast (referred to the weight of casein-flour mixture) may be applied in the same proportion as with ordinary bread, however since there is less fermentable material present in the casein flour mixture, good results are obtained with 15–30 percent less yeast also. The most advantageous water quantity to be utilized is approximately 80–85 parts by weight, calculated on the basis of 100 parts by weight of the casein-flour mixture. The dough for bread is best prepared by heating the total quantity of water to be used to 40–50° C., mixing it with a small part of the casein-flour mixture and the total quantity of the yeast, allowing it to lie in a warm atmosphere (kitchen or workshop temperature) for 20–30 minutes, and adding the remaining part of the casein-flour mixture to the watery leaven. In this part of the operation, mixing must still be carried out with a spoon, the mixture being sticky in the beginning, after 5–10 minutes, however, it is developed to form a paste which can be kneaded and beaten. The beating itself can then be carried out in the conventional manner, by hand or machine, then loaves are formed and allowed to rise in a warm atmosphere for 2–3 hours.

From the point of view of product quality, the water content is very important, since water quantities exceeding the necessary will result in pastes, which are too soft and are flattened during rising, whereas use of too little water causes the gas bubbles formed during rising to remain small and the density of the baked bread becomes greater than required. In the case of adequate water content and correct setting of the pH value, rising will take place normally, the texture of the paste is good, and the latter maintains its form during rising well. The baked bread has suitable density and water content, exhibits uniform texture when cut, the large quantity of adequately swelled casein is incorporated into the bread imperceptibly, and the taste, smell, resilience, and consistency upon chewing meet the requirements for ordinary bread of good quality.

Baking the bread or rolls prepared according to the process covered by this invention is carried out essentially in the conventional way. The temperature of the baking oven should be below 250° C., if possible 230–240° C. Baking is carried out at this temperature for 20–30 minutes to form the crust of the bread; as soon as a light thin crust has been formed, baking is continued for further 30–40 minutes at a temperature not exceeding 150° C. to remove the excess water from the bread.

In the case of products which are not baked, such as pastes to be cooked, production technology is even less different from that of products made from pure wheat flour. Due to the smaller aleurone content of the casein-flour mixture, care must be taken to employ the correct amount of water; it is advisable to add 740–750 g. water to 1000 g. casein-flour mixture. In the case of pastes, four whole eggs have to be added to such flour quantities. Water is added to the flour mixture in a lukewarm state to promote swelling of the casein. The obtained warm dough is allowed to cool, then it is beaten, kneaded, and worked to noodles or pastes of other shapes by hand or by machine, applying the conventional methods.

Carrying out the process according to this invention in practice is illustrated by the undernoted examples:

Example 1

35 g. sodium chloride, 20 g. potassium bicarbonate, 1.5 g. aluminum hydroxide and 1250 g. water are added to 1000 g. fine ground alimentary casein. On thorough mixing and standing for approx. 10 minutes, the swollen casein mass is heated in a metal mould by vapour stream without mixing to maintain its temperature at 90–100° C. for at least 30 minutes. The semi-solid obtained is then ground in a meat grinder, dried in air stream at 50–60° C., and ground to flour grade in an air dried state. The product of approx. 1100 g. is a tasteless powder of somewhat yellowish (ivory) colour, which swells in water well, is not sticky, and its pH is 5.5. This dry, swelled casein, which is stable in storage, is mixed with wheat flour in a proportion of 1:1, and used for the preparation of bread, baked goods, or alimentary pastes.

Example 2

To 500 g. of the dry swelled casein described in Example 1, 500 g. wheat flour is added and with 60 g. yeast and 830 g. water bread dough is prepared according to the above method. The dough is kneaded, allowed to rise, divided into five loaves and then baked. Five tea bread like loaves are thus obtained, each having an average weight of 310 g. and contain 24 percent carbohydrates, 33.5 percent protein, 40 percent water; their pH=5.45.

The taste and texture of bread prepared by this method is similar to well worked and well baked home made rye bread; its colour and the character of its cut surface resembles this kind of bread, together with its property to dry more slowly, than pure wheat bread (owing to the water retaining capacity of the casein present in the bread). It does not exhibit a tendency to sour, and is palatable even after two or three days.

Example 3

To 550 g. of the dry casein (pH=5.5) prepared according to Example 1, 450 g. wheat flour is added and with 50 g. yeast and 825 g. water dough is prepared as described above, and five loaves are baked from it according to Example 2. The average weight of the finished loaves is 320 g. each, they contain 21.5 percent carbohydrates, 35 percent protein, and 41 percent water, the pH is 5.5. The properties of the finished bread are similar to those of the bread in Example 2.

Example 4

468 g. fine ground edible casein (pH 4.05) is mixed with 500 g. wheat flour and 14.4 g. potassium bicarbonate, 4.2 g. calcium carbonate, and 18 g. sodium chloride are added, also in a fine ground state. Bread is prepared from this casein-flour mixture adding 50 g. yeast and 825 g. water, in accordance with Examples 2 and 3. The average weight of each of the five loaves obtained is 315 g., carbohydrate content 24.5 percent, protein content 31 percent, water content 40 percent, pH=5.45.

The breads are of a somewhat lighter colour than those described in Examples 2 and 3, but the other properties are identical.

Example 5

Proceed according to Example 4, the only difference being that 7.5 g. sodium chloride and 15 g. potassium chloride are added instead of 18 g. sodium chloride. The average weight of each of the five loaves amount to 318 g., they contain 24.2 percent carbohydrates, 30.8 percent proteins, 40.5 percent water, pH=5.45.

The properties of the bread are identical with the bread prepared according to Example 4. Similarly, it tastes good and is mildly salty, in spite of the fact, that salting was chiefly done with potassium chloride, and the proportion of elemental K to Na is 4:1 in this bread.

Example 6

Proceed according to Example 4, the only difference being the application of 250 g. rye flour and 250 g. wheat flour instead of 500 g. wheat flour. The average weight of the five loaves obtained amounts to 320 g., they contain 24.3 percent carbohydrates, 30.7 percent proteins, 41 percent water, pH=5.45.

The bread is of a somewhat darker shade and more compact texture than that made of pure wheat flour, but it is equally unobjectionable as regards taste and quality, as the others.

Example 7

500 g. dry swelled casein, prepared as described in Example 1, but without adding sodium chloride, is mixed with 500 g. wheat flour. 375 g. water is heated to 50° C., the casein-flour mixture added with the exception of 100 g. put aside for later use, and finally four stirred eggs (180 g.) mixed with it. The soft mass is allowed to stand for 20 minutes, thoroughly kneaded, and the half-solid dough is divided into five smaller dough loaves, which are allowed to stand for 10–15 minutes. In this state, the dough can be extended to noodle thinness; in the course of the extension the part of the casein flour mixture which has been put aside is used for the conventional "flouring." Part of the dough is processed to "tarhonya," i.e., a Hungarian dried and granulated pastry made of flour and eggs, utilising again the conventional technology. The behaviour of both the noodles and "tarhonya," whether they are employed in the fresh state, or after drying, is identical with that of the highest quality pastes made of wheat flour and containing four eggs, and so is the taste of the product. The paste dried in an air stream at 60° C. contains 36 percent carbohydrates, 47 percent protein, and its pH=5.6.

Example 8

12.7 g. potassium bicarbonate, 3.7 g. calcium carbonate, and 500 g. wheat flour is admixed to 484 g. fine ground edible casein (pH=4.2). This casein flour mixture is processed with 740 g. water and four eggs (180 g.), according to Example 7. A dough of similar quality is obtained, which differs from the dough described in Example 7 so far, that if processed in the fresh state, a somewhat softer, but unobjectionably palatable product is obtained. If, however, the raw dough is first dried and cooked only thereafter, the texture of the cooked product will be the same as that of the noodles prepared according to Example 7. The carbohydrate content is 36 percent, the protein 47.5 percent, and the pH=5.55.

Example 9

Proceed as in Example 8, with the exception that instead of four eggs 58 g. egg powder (corresponding to 200 g. fresh eggs) and instead of 740 g. water 880 g.

water is employed. As regards taste, texture, and behaviour during cooking of the product, they are similar to those of the product obtained in Example 8. Carbohydrate content of the dried paste amounts to 35.5 percent, its protein content to 48.6 percent, and pH=5.6.

*Example 10*

Proceed as in Example 4, with the following difference in the proportion of ingredients: 500 g. wheat flour is mixed with 468 g. fine ground rennet casein (pH=7.85), 22 g. sodium chloride, and 20 g. citric acid. This flour-casein mixture is processed to bread employing 50 g. yeast and 800 g. water, by the method described in Examples 2 and 3. The average weight of each of the obtained five finished loaves is 300 g., carbohydrates content 25 percent, protein content 31.5 percent, water content 39 percent, pH=5.60. The colour of the bread made entirely with rennet casein is lighter, than that prepared with acid casein.

*Example 11*

Proceed according to Example 10, with the difference, that for the purpose of better development of the rennet casein, some potassium bicarbonate is added to it, viz. 500 g. wheat flour, 468 g. rennet casein (pH=7.85), 22 g. sodium chloride, 30 g. citric acid, and 10 g. potassium bicarbonate are mixed. This flour-casein mixture is processed to obtain bread according to Examples 2 and 3, utilising 50 g. yeast and 850 g. water. The average weight of each of the five finished loaves obtained amounts to 305 g. protein content, carbohydrate content, texture, colour, are similar to Example 10, pH=5.70.

What we claim is:

1. A process for the production of a product selected from the class consisting of baked goods and alimentary pastes of reduced carbohydrate content and rich in protein content, comprising mixing 100 parts by weight of the flour employed for the preparation of the product with 20–120 parts by weight of edible casein, adjusting the pH of the mixture to between 5.1 and 5.7, and heating the mixture in the presence of moisture at a temperature above 70° and up to 100° centigrade for a time sufficient substantially to swell the casein.

2. A process for the production of a product selected from the class consisting of baked goods and alimentary pastes of reduced carbohydrate content and rich in protein content, comprising mixing 100 parts by weight of the flour employed for the preparation of the product with 20–120 parts by weight of edible casein, adjusting the pH of the mixture to between 5.1 and 5.7, and heating the mixture in the presence of moisture for a time and at a temperature sufficient to prepare the finished product.

References Cited by the Examiner

UNITED STATES PATENTS

| | | | |
|---|---|---|---|
| 2,059,905 | 11/36 | Powers | 99—90 |
| 2,654,672 | 10/53 | Selman et al. | 99—90 |
| 2,813,794 | 11/57 | Anson et al. | 99—14 X |
| 3,076,710 | 2/63 | Koolhaas | 99—90 |

A. LOUIS MONACELL, *Primary Examiner.*

BEATRICE H. STRIZAK, *Examiner.*